United States Patent [19]

Tolin et al.

[11] Patent Number: 5,490,061

[45] Date of Patent: Feb. 6, 1996

[54] IMPROVED TRANSLATION SYSTEM UTILIZING A MORPHOLOGICAL STRIPPING PROCESS TO REDUCE WORDS TO THEIR ROOT CONFIGURATION TO PRODUCE REDUCTION OF DATABASE SIZE

[75] Inventors: Bruce G. Tolin, Barrington, Ill.; Mark Hatch, Lynn; Barry M. Kasindorf, Framingham, both of Mass.; Stanley Tolin, Barrington, Ill.; Richard Brisk, Wayland, Mass.

[73] Assignee: Toltran, Ltd., Island Lake, Ill.

[21] Appl. No.: 403,683

[22] Filed: Sep. 5, 1989

Related U.S. Application Data

[63] Continuation-in-part of Ser. No. 10,989, Feb. 5, 1987.

[51] Int. Cl.$^6$ .................................................. G06F 17/28
[52] U.S. Cl. .................................................. 364/419.02
[58] Field of Search ................................ 364/419, 900, 364/419.02, 419.05, 419.04, 419.11

[56] References Cited

U.S. PATENT DOCUMENTS

| | | | |
|---|---|---|---|
| 4,342,085 | 7/1982 | Glickman et al. | 364/419.11 |
| 4,594,686 | 6/1986 | Yoshida | 364/419.13 |
| 4,641,264 | 2/1987 | Nitta et al. | 364/419.04 |
| 4,701,851 | 10/1987 | Bass et al. | 264/419.12 |
| 4,724,523 | 2/1988 | Kucera | 364/419.11 |
| 4,730,270 | 3/1988 | Okajima et al. | 364/419.02 |
| 4,775,956 | 10/1988 | Kaji et al. | 364/419.07 |
| 4,777,617 | 10/1988 | Frisch et al. | 364/419.08 |
| 4,799,188 | 1/1989 | Yoshimura | 364/419 |
| 4,799,191 | 1/1989 | Yushimura | 364/419.12 |
| 4,862,408 | 8/1989 | Zamora | 364/419.11 |
| 4,864,501 | 9/1989 | Kucera et al. | 364/419.08 |
| 4,864,503 | 9/1989 | Tolin | 364/419 |

OTHER PUBLICATIONS

"Machine Translation Poised for Growth", High Technology, vol. 6 No. 6 pp. 53–55, Charles Connell, Jun. 1986 Abst. from File 275 of Dialog. AN 04258928.

Primary Examiner—Gail O. Hayes
Assistant Examiner—Charles R. Kyle
Attorney, Agent, or Firm—Laff, Whitesel, Conte & Saret, Ltd.

[57] ABSTRACT

A machine translation system having a natural language source module for accepting externally introduced text in the source language. The system is broadly based upon the concept of Chaos and conducts a divergent search in the source language, a morpheme root database, and further includes a morphological word stripping means that is to be implemented on a data processing device. The system source module provides the steps whereby each of the words in a subject clause, phrase, or sentence of the externally introduced source language text are individually compared first to data in a lexical database and if the individual words are not found among the data in the lexical database then the words are subjected to the morphological word stripping means which are directed to the affixes of the words and first to the stripping of suffixes, if any, from each word followed by the step of comparing an individual stripped word, in the absence of that particular word's stripped suffix, with the data in the morpheme root database, which comparison normally proceeds downward through descending length character strings until a morpheme root match is found. The stripping and comparison with the database are repeated as often as required to find a root match.

14 Claims, 5 Drawing Sheets

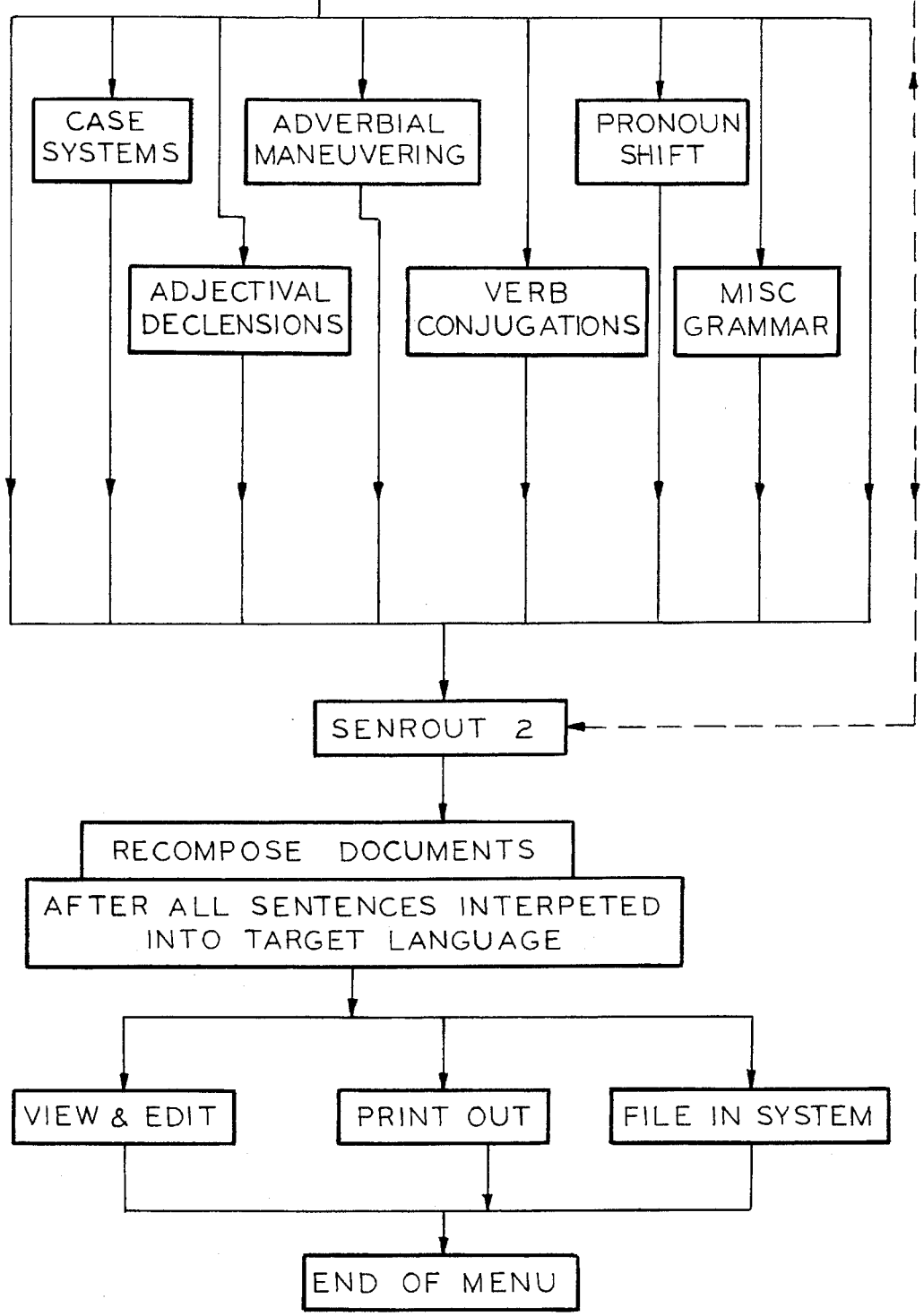

IMPROVED TRANSLATION SYSTEM UTILIZING A MORPHOLOGICAL STRIPPING PROCESS TO REDUCE WORDS TO THEIR ROOT CONFIGURATION TO PRODUCE REDUCTION OF DATABASE SIZE

BACKGROUND OF THE INVENTION

This is a continuation-in-part of application Ser. No. 07/010,989, filed Feb. 5, 1987.

The present invention relates to the translation of documents having a source text written in any one of a plurality of national languages being translated into a text that is written in any one of a plurality of second target national languages by utilizing a created international language as an intermediate pathway between the two chosen national languages.

The desire of various nationalities speaking different languages to readily converse has been ever present in the history of humanity. There are about 3,000 known languages in the world (the number varies according to what is counted as a language; dialects that are clearly just that are not included in this number), and each is the vehicle of a culture that is different in at least some ways from any other culture. The learning and teaching of languages, the recording of languages in intercultural communication are matters of primary importance.

Languages have had to be taught and learned for centuries. Everywhere, when speakers of different languages have come in contact, somebody had to learn a foreign language. There have always been individuals who found it interesting or profitable to do this. The earliest of explorers and traders were forced by necessity to learn to understand one another's language or to perish in the economic as well as the physical worlds. This, as we all know, resulted in extensive and long language studies with the erudite academicians handling the complex aspects of the communications exchange, while the more pragmatic day-to-day traders and businessmen developed short terse means of communication. A need arose to satisfy the requirements of an exact but easy means for correspondence between lay persons and small businessmen.

Small, handheld, phrase books proliferated to facilitate phonetic intercourse by visiting tourists and servicemen. Unfortunately, the phonics in these booklets, as well as their limited scope, limited the amount of intercourse possible. Small dictionaries that permitted word to word translation were available but unfortunately they did not provide a means for transposing words to give a more accurate grammatical rendition in the target language. Variations on these items became available upon the appearance of the liquid and gaseous crystal readout devices which permitted storage of a limited vocabulary of words and their direct translatable equivalents in a phonic form. Here again, the limited capacity did not permit the introduction of adequate grammatical improvement of syntax.

The advent of the personal computers and the microprocessors has brought a flood of approaches to the patent offices around the world. The devices have ranged from direct word for word translation devices to key word translation directly into phrases. For example, a word to word translation device can be found in U.S. Pat. No. 4,502,128, TRANSLATION BETWEEN NATURAL LANGUAGES, this patent being directed to an inputting of a sentence described by a first natural language being sectioned into individual words. Parts of speech corresponding to these individual words are retrieved from a lexical word storage, whereby the input sentence is described by a corresponding string of the parts-of-speech as retrieved. A translation pattern table previously prepared compares strings of parts-of-speech for the first natural language with those of the second language and transforms the first strings of parts-of-speech into strings of parts-of-speech of the second language. The output sentence described by the second natural language is generated by sequencing target words in accordance with the sequential order of the parts of speech of the string pattern obtained after the transformation. This is a complex procedure at best.

U.S. Pat. Nos. 4,412,305; 4,541,069 4,439,836 and 4,365,315 relate to translation devices wherein a single word is used as the input to produce the translation of entire groups of words, such as sentences or phrases; a single word entered will access particular sentences within limited subject categories; letters within words or groups of words produces an equivalency detectable by a comparison circuit resulting in the representation in a second language of a plurality of words regardless of whether it is a noninflected word or an inflected word; and phrases can be tied to computer specified aural or visual control messages for use by an operator who chooses to use a particular language in the operation of a machine tool. Similarly, alphabetical accessing to an electronic translator can be accomplished by storing address codes with each word, as in U.S. Pat. No. 4,541,069; as well as utilization of a system for automatically hyphenating and verifying the spelling of words in a multi-lingual document can be carried out under U.S. Pat. No. 4,456,969.

As can be seen from study of these prior art references, generally found in U.S.Cl. 364/900, a direct translation from one natural language to another natural language has a multiplicity of roadblocks, either in the lack of an available direct translation or in major grammatical problems due to language structure or in the relative stage of development of one of the languages.

Later patents relating to translation systems and apparatus can be found in U.S. Pat. Nos. 4,774,596; 4,774,666; 4,800,522; 4,814,987; 4,814,988; and 4,833,611. These patents relate, among other things, to the use of translation dictionaries, defined grammatical rules and tree conversion rules which, unfortunately, are quite rigid in nature in that the apparatus and systems involved merely utilize direct translation between languages and rigid grammatical relationships. They do not have the flexibility or adaptibility necessary to handle the translation of unique clauses or phrases.

None of the cited references have the universality and reversibility that is found in the present invention and its improvements set forth hereinafter. The cited references are useable only with a single source language going into a single target language. To adapt such reference devices and systems for use with other languages would require a complete reworking of the programs.

SUMMARY OF THE INVENTION

The present invention relates to the translation between two national languages by the utilization of an improved intermediate step or pathway of translating into an improved created international language from a first or source national language and then translating from the improved created international language into a second or target national language.

Such a translation is reversible in either direction through the intermediate path and can accommodate translation from one national language into the created international language intermediate path and then translation into any one of a multiplicity of second national languages from the created international language intermediate path text.

It must be recognized that, while the term "created international language" or "artificial language" is used herein, this invention contemplates as well the utilization of alphabetic, numeric, alphanumeric, symbolic (or any combination of these) that relates to a compressed vocabulary and/or syntax (or a non-compressed vocabulary) but with each having a simplified and regular grammar.

While the original invention generally contemplated the use of forms of Esperanto, or other universal created languages, as the intermediate path, the present improved form utilizes this as well as stripped words that are primarily in their root form and capable of accepting a multiplicity of endings that may transform the root from an adjectival form to the adverbial form, or to transform a verb to a noun, or vice versa. Thus, Esperanto or intermediate path language of the original invention now includes one or more indicators or tags which provide a complete grammatical and lexical analysis of a particular word. All of this information is appended into the intermediate language for a particular word, i.e., a tag on the word delineates the type word that it is; another tag indicates its relative part of speech, there are tags that have to do with verb tensing information and construction information, for instance, whether it is a part of a phrase, or a clause, or things of that nature. This numbering and word definition must generally be non-specific in nature since the system is utilized to go from language to language and it is desireable to remain independent, whereby the intermediate language has the ability of branching out into any other language that is chosen, based on the information that is given to it.

An economic consideration of the improved invention is to provide a means for permitting its use on PC-type computers that are readily available for office usage rather than building up a monster size data base that will require a huge mainframe computer in order to carry out the translations contemplated. Therefore, it was resolved to utilized a single intermediate path disk that can be used with any combination of source language-target language disks to reduce the memory capacity of the operating computer required to carry out such a translation. Thus, the universality and reversibility are maintained with the only change being to restrict the dictionary and morphology data base required for the selected source and target languages.

A powerful morphology analysis is utilized that goes onto the words themselves. What this does is to strip endings and/or prefixes off of words to get them back down to their roots so that the dictionary does not list for the most part all of the forms of a word, but rather it only lists their roots. The morphology analysis can also be used to find out if, for example, a word is a verb that has been made into a noun, or, if it's an adjective that has been made into an adverb, or other transitional configurations, all of which possibilities can be taken care of with the morphology. Thus, the database, what is in the database itself, while its size may be small, the morphology amplifies what is in there by an order of magnitude. For example, no plurals are indicated in the database itself, very few "-ly" adverbs are indicated in the database because the morphology can find those things, mark them as such and that gets marked onto the intermediate language that this is the root form of the particular word. If it is an adjective which has come to be an adverb, then this information can be used in any other language by taking the corresponding root word in the other language and turning it into its appropriate usage as the other language would require. This permits the database to be kept to a minimum and to admit other more important things into the database without taking up a lot of room with plurals and other things of that nature which can be made or broken as needed, thereby giving a lot richer language possibility in the translation process.

The use of parse and flags to numerically keep track of the sentence or clause being worked on also expedites the operation of the method.

BRIEF DESCRIPTION OF THE DRAWING

FIGS. 2A and 2B are an expanded block diagram showing a schematic arrangement of the flow of information within a computer under the method of the present invention and can be referred to in following the description that follows;

DESCRIPTION OF AN EMBODIMENT

This invention contemplates the usage of a computer, such as an IBM PC or PS/2, that utilizes MS-DOS or Micro Channel architecture and is capable of accepting BASIC as well as other programming languages, such as C, Assembler language, Cobol, Fortran, or any other compatible computer language. Other software such as compilers plus other speed enhancing arrangements can be utilized in subroutines as well as in the main stream of this method.

As was indicated above, this method of translation between two national languages includes the step of utilizing a created international language bridge, whereby any one of a plurality of national languages can be compatibly translated into the chosen created international language and, then, can be translated from the created international language into any chosen one of a plurality of national languages. There are several such "created" international languages, the most common of which is Esperanto created in the 1880's by Dr. Ludovic Lazarus Zamenhof (1859–1917) of Poland. It contains a compressed vocabulary (roughly one-tenth the number of words as English) and a completely simplified and regular grammar. This eliminates the need for many complex mathematical statements to account for the grammatical differences between existing national languages. While other created international languages, for example, Inter Lingua, Modified Esperanto, or Volupuk, could be used, the present disclosure utilizes a modified or stripped down Esperanto. It must be recognized that, while the term "created international language" or "artificial language" is used herein, this invention contemplates as well the utilization of alphabetic, numeric, alphanumeric, symbolic (or any combination of these) that relates to a compressed vocabulary and/or syntax (or a non-compressed vocabulary) such as a data base of word roots but with each of these having a simplified and regular grammar which can be modified by one or more of identifiable suffixes or prefixes.

Figure 1:
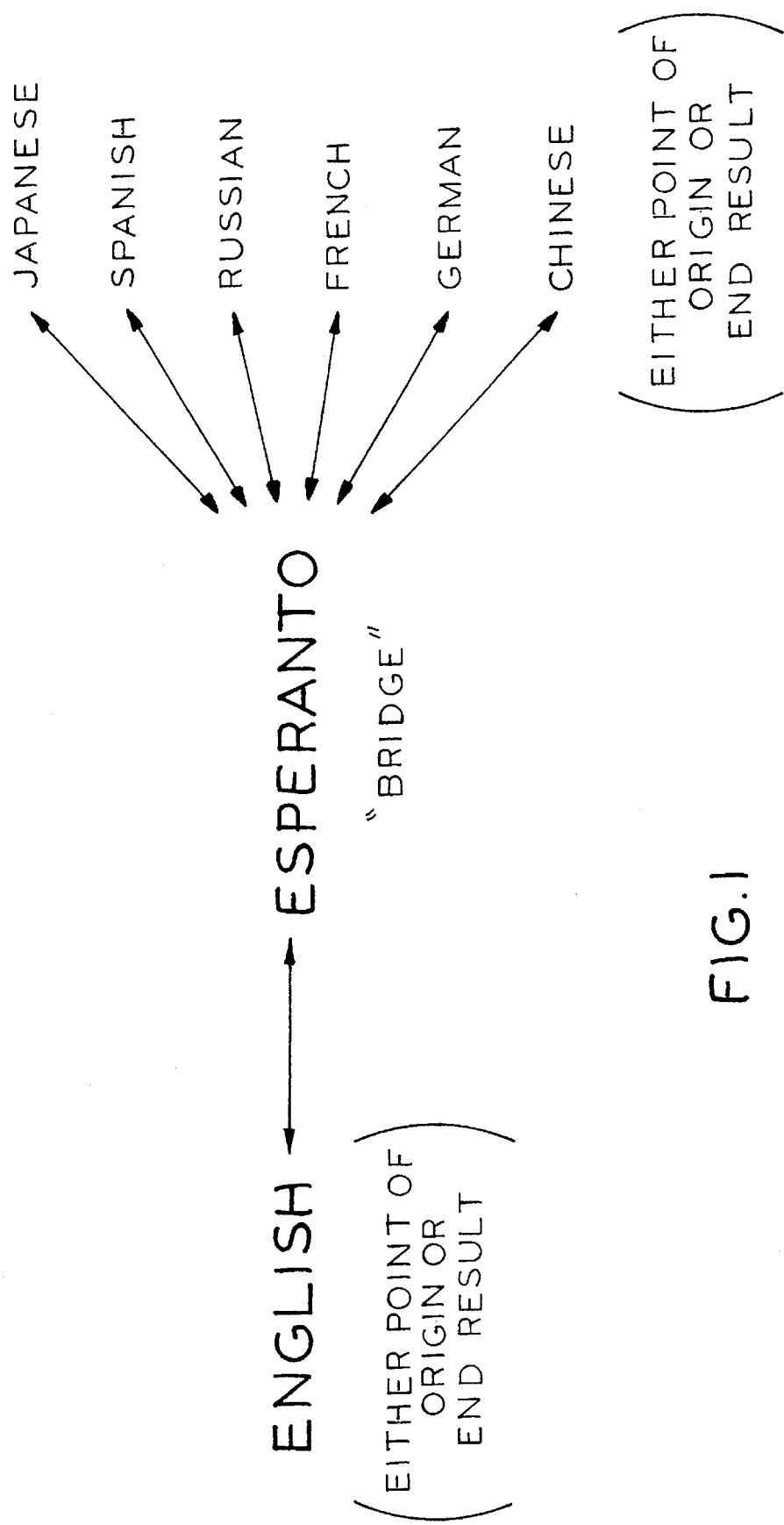
FIG. 1 is a diagramatic showing of the utilization of a created international language, the example utilizes Esperanto although others could be used, as an intermediate pathway in translating between two national languages.
Figure 3:
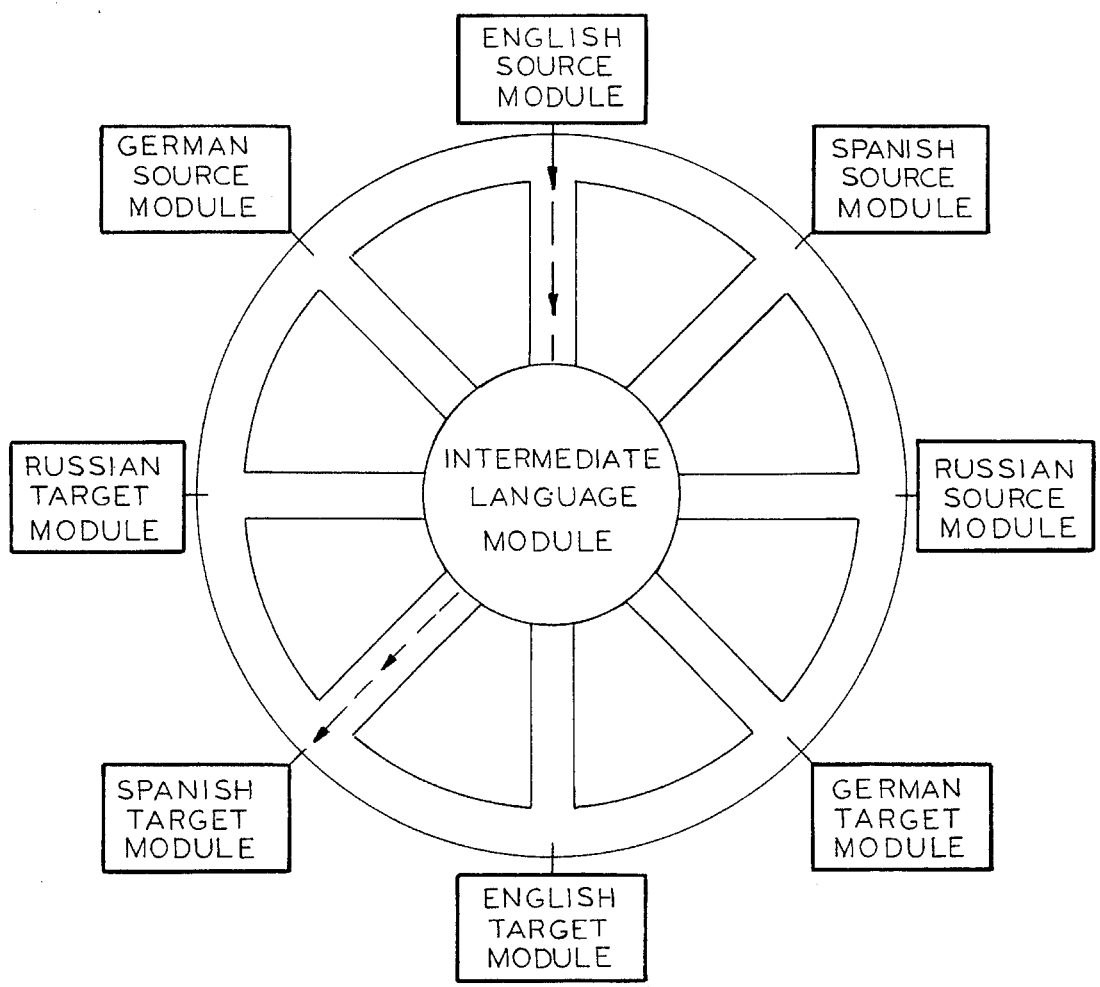
FIG. 3 is a wheel shaped schematic showing the intermediate path created international language module being located at the "hub" of the wheel, while the source and target language modules are located at the ends of the spokes with their sole interconnecting path being universally and reversibly through the "hub" or intermediate created language path.
Figure 3A:
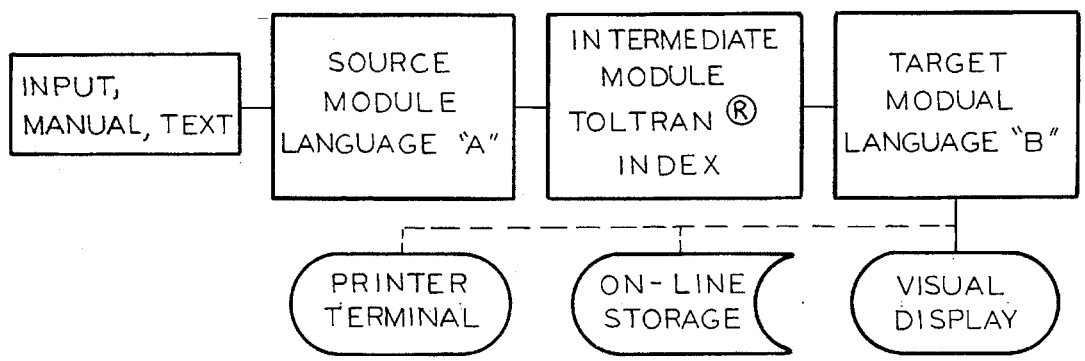
FIG. 3A is a schematic diagram showing in abbreviated format the keyboard where the text is manually input, the source module of language "A", the universal intermediate module, and the target module of language "B", with ancillary items such as the visual CRT display, on-line storage means, and a printer terminal.

There are Esperanto textbooks available in some fifty languages. The two national languages used in the illustrated embodiments of this specification are English and Spanish, however, the method can be successfully utilized with a multitude of other languages, i.e., Japanese, German, French, Russian, and Chinese, etc. Additionally, most all languages are compatible with an intermediate simplified and regularized language, one of which is Esperanto, and they could be readily adapted for use with this method. It must be realized that, by utilizing a regularized Esperanto (or colloquially, Esperantoish) as the intermediate pathway between the two national languages, the method is reversible and the translation from language A to language B can go in the opposite direction, from language B to language A, with equal facility, see FIGS. 1 and 3.

In the original application, Ser. No. 07/010,989, filed Feb. 5, 1987, a limited multiple language dictionary data base, including Esperanto, was prepared and placed on a limited access disk; along with other subroutines, that can be accessed by computer, were provided and called upon to smooth out the translation as it progressed. It was recognized that it is not only possible, but also acceptable, in certain circumstances, to utilize the simplistic approach of translating from a base national language into Esperanto and then directly into the target national language. This often produces an elementary type of resulting language that is totally acceptable in instances where the recipient of the document is not linguistically sophisticated, or where the message being conveyed does not require additional nuances. This is often utilized to great advantage in brief offers and acceptances in commercial transactions, where one party orders a specific quantity of a product having a generic name utilized in both languages and the second party merely confirms availability and delivery information. It also is often readily acceptable in the scientific community.

Figure 2A:
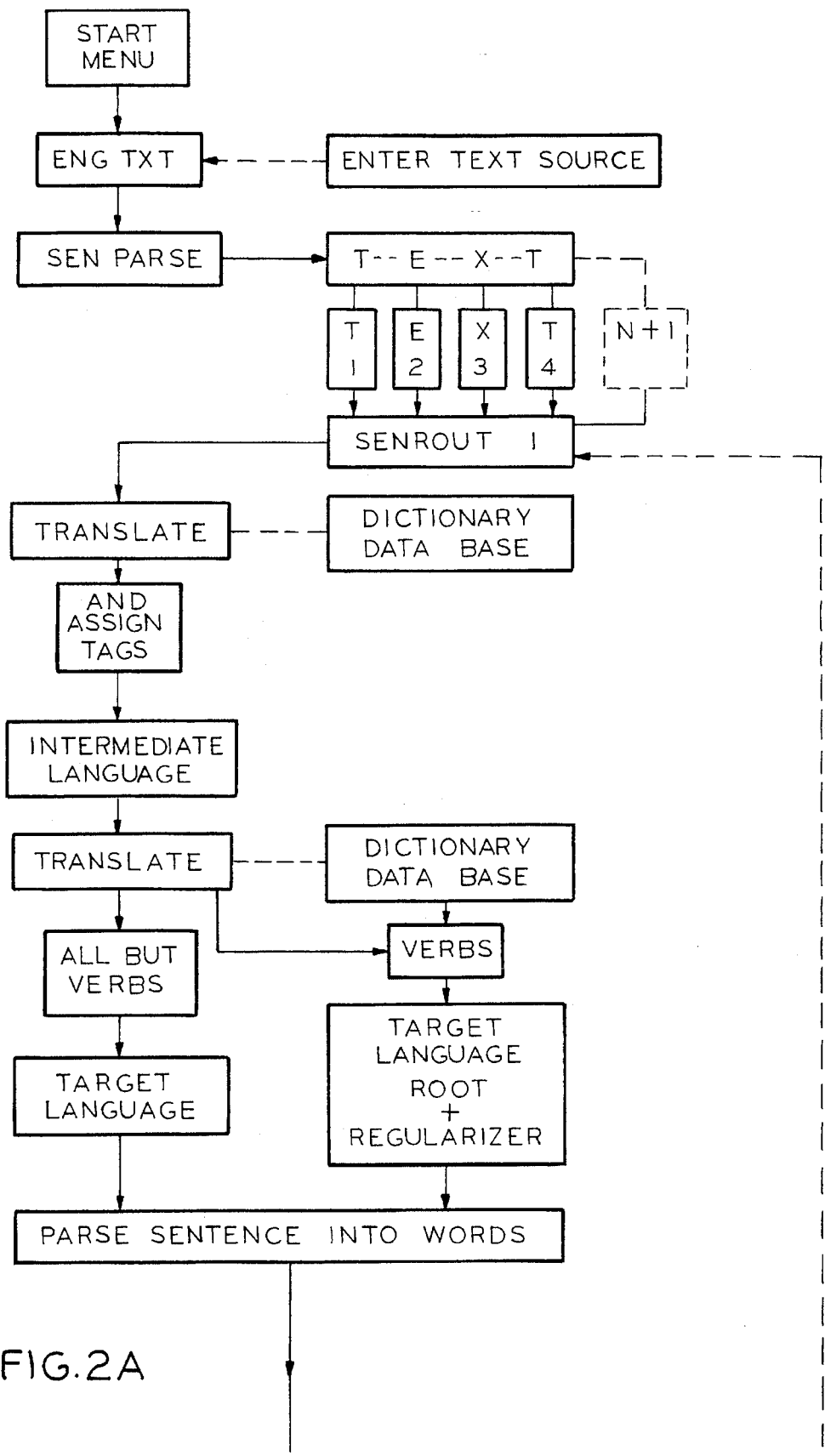
Figure 4:
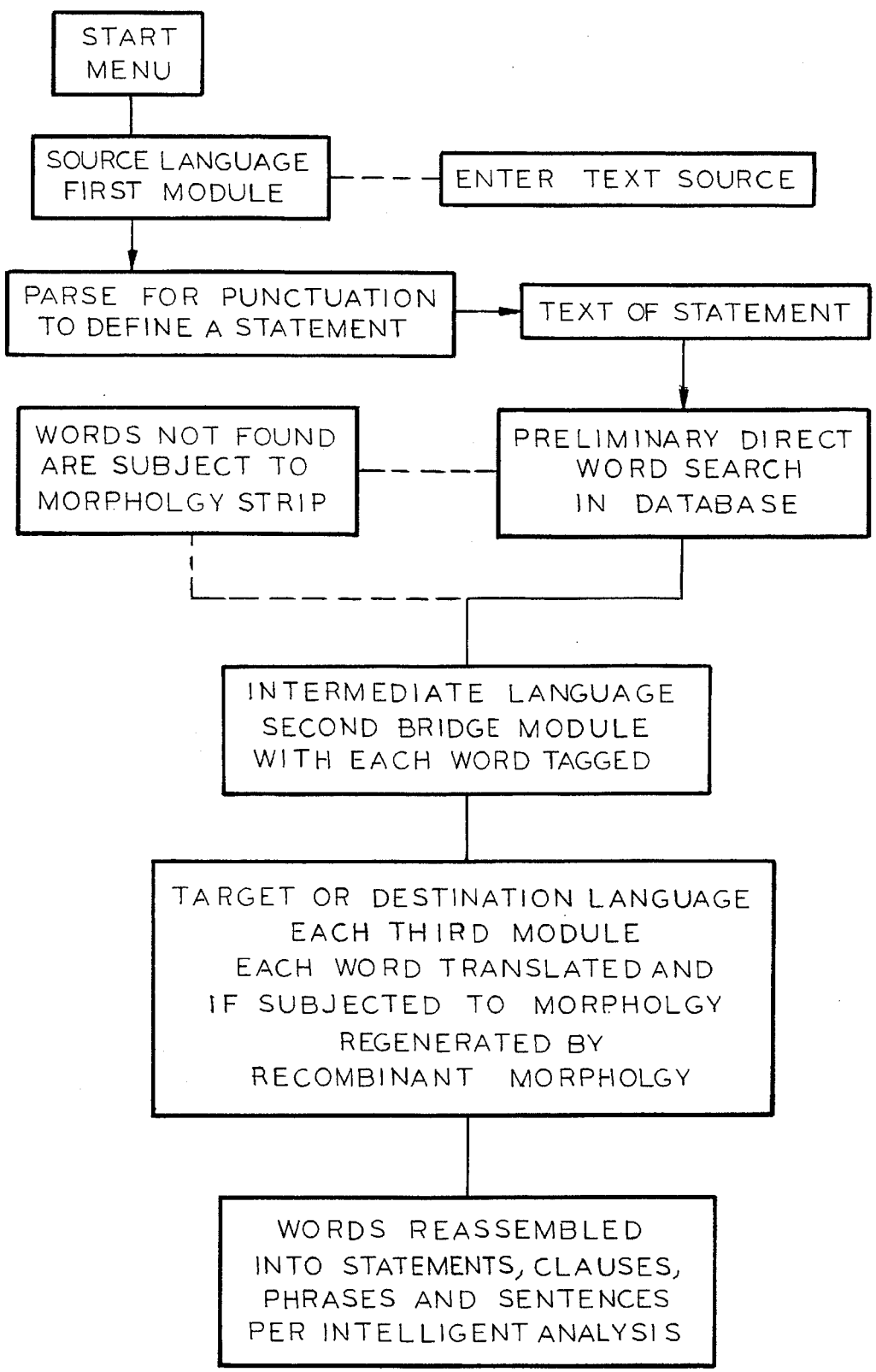
FIG. 4 is a schematic diagram showing the improved flow of information utilized in the improved translation system.

The niceties required in social intercourse, however, can be supplied by the application of the other subroutines shown in abbreviated flowchart form in FIG. 2, as well as the improved routines shown in FIG. 4 and which are described now in more detail.

An operator makes a choice, from an appropriate starting menu, of the national language that will be used in entering the text that is to be translated. From a keyboard terminal, the source text in the chosen language, in this example English, is introduced into the computer and placed in a created text file.<ENGTXT> (It should be noted that the language of the boxes in the flow chart of FIG. 2 will be utilized in the description of each of the steps in this method)

When the text has been fully entered into the text file it is then operated upon and parsed into individual sentences with each sentence being placed in it own file.<SENPARSE>

Each of the individual sentence files is preferably "flagged" whereby it is numerically kept track of, thereby aiding the computer in ascertaining which sentence it is working on, as well as providing a return point of a loop for operation on successive sentences <SENROUT1>. (In the flowchart of FIG. 2 the term "TEXT" is whimsically shown as being broken up into individual parts and includes an additional one indicated as "n+1" which would indicate that all of the sentences had been handled and the computer would then proceed to the steps leading to "end".)

With the text parsed into individual sentences and properly flagged, the individual words are translated from the original text language, English, into Esperanto to form the streamline intermediate pathway. Each individual word is assigned a grammatical tag as it is being translated. All irregular verbs in English are "smoothed out" into regular ending Esperanto verb endings. Since Esperanto uses one-tenth the number of words that are found in the English vocabulary the number of "lookups" in the electronic data base is drastically reduced. The dictionary data base, as was previously noted, is provided with limited access whereby introduction of special words that have a highly repeated volume of usage or which are of a specialized nature, i.e., medical, scientific, or restricted commercial, can under proper circumstances and procedures be added to the dictionary.

Continuing this translation, it is placed in a temporary file until the entire sentence being acted upon is completely translated into the intermediate language.

The next step is for the computer to access another sector of the electronic dictionary data base for the translation of all intermediate pathway Esperanto words (except verbs) into the target language equivalents.

Each sentence then is parsed into individual words, each being preferably assigned their own temporary file.

After each sentenced is parsed, the program may terminate by utilizing the path to the far left in FIG. 2 and proceed solely on the basis of the translation from the source language into the intermediate pathway language and thence into the target language. As has been previously indicated, there are circumstances where such a translation is totally adequate and has the advantage of speed. If, however, a more refined interpretation is required then the program provides a plurality of alternative subroutines which can be called up for action on the parsed sentence. There is no important order or sequence in which these subroutines must be used. Further, it is not mandatory that each of them be used in the smoothing process since it is conceivable that, due to structure of the target language, it might not require or permit the application of a particular subroutine.

It is important to remember that each time an individual word is transformed, or acted upon in any fashion, it is replaced in its sentence at the end of the subroutine then being utilized. Similarly, the order set forth in this descriptive material is not controlling of the ultimate order of use, nor does it affect the outcome anticipated.

Going forward with the translation, the parsed sentence may proceed to the subroutine where the miscellaneous grammar program moves the position of words within the translated sentence, where necessary, or, conjugates irregular verbs, or, deals with "one-of-a-kind" situations peculiar to the target language, in this example Spanish.

In certain languages there exist a system of cases, meaning, certain words will appear differently by themselves, or will change the manner in which "surrounding" words (such as adjectives) are used in conjunction with such words. These "Cases" can be applied, where necessary, for a particular language.

Adjectives are declined according to the rules of the target (Spanish) language, based upon prepositions encountered in a particular phrase, and the noun following. This is accomplished through the use of context recognition, which is utilized in another of the steps available herein.

An infinitives program (not shown) restores verbs to their "dictionary" format, as required; in the target language.

An adverb program acknowledges the idiosyncrasies of various languages and shifts adverbs around verbs in the fashion of the chosen target language: e.g. "He speaks fluently" - - - "He fluently speaks", . . . etc This is another polishing operation available in this method.

There often are different verb conjugations that are unique to the target language (both in "regular" as well as "irregular" verbs). Instead of having an astronomical number of irregular verbs in the original language that must be matched to an excessive number of verbs in the target language, this is an area where the intermediate pathway language, in this embodiment, Esperanto, saves time and computer memory storage space in that the combinational possibilities are reduced by going through the "regular" Esperanto verb stage. To provide smoother text, however, this subroutine can be utilized to handle the verb conjugations in the target national language.

Quite often a pronoun will change based upon context, for example, if the pronoun is "doing" something it will differ from the same pronoun that is "being acted upon". The context evaluation and correction will be handled in the subroutine designated Pronoun Shifts.

As sort of a sentry or watchdog the sub-routine <SENROUT2>, in the present method, checks the "flag" previously generated in "SENROUT1" and decides where to go,i.e.,to do another sentence, or, to go on towards "end", in the Menu, if there are no more sentences to do.

All of the sentences can be individually collected in a single temporary file where the final document is recomposed sentence by sentence in the target language, all within the same file. (It must be remembered that this could be designated "RUSSIAN" or any other national language that is serving as the target language) This file can also be used if the final translation terminated with the translation from Esperanto to the target language without utilizing any of the "fine tuning" subroutines discussed above.

In the final sub-routine of the method, this step strips off any grammatical tags accumulated during the translation/interpretation process and can, if desired, "print" the words of each sentence.

The document is now available, optionally, for a final viewing in the target (Spanish) language, and, if desired, for final manual editing prior to hard copy printing.

The final optional printing operation permits a choice of printing "hard copy" of either or both the original national language source text and the target national language text. Files can be preserved in chosen subdirectories and/or can be edited and interfaced with compatible word processing programs prior to possible filing in a chosen subdirectory. The program returns the user to the Menu in preparation for the next translation.

As was previously indicated, two of the optional steps were not interfaced with the program described. These, once again, are subroutines or files that may provide additional smoothing out of the final translation. The first of these optional steps in the method would further refine the initial input by a series of files which would sequentially: i) immediately parse sentences into individual word files, ii) such parsing would not only translate words into the created international language as each word is entered into its individual file, but, also, it would add a grammatical tag on each word, e.g. "you" - - - "PN:you PN;" (PN=pronoun); iii) this is based on words before or after, determines if a word is a noun or verb. This is a context determiner that basically is a form of "artificial intelligence" and requires an in-depth analysis, with multitudinous examples to be checked against, of the context being acted upon.

The other optional operation takes place in treating the accomplished translation by taking care of the English language peculiarity of having forms of "to do" or "do" in front of verbs,(e.g. I do go=I go/I did go=I went).

While these refinements are often desirable in social niceties, they are not mandatory for simple correct communication, but rather merely show an in depth knowledge of the nuances of the language. In certain instances this can be of great help from a social prestige position, however, the day to day dealings can probably be handled quite as effectively without bowing to the added time parameter required for these refinements and obtain the same efficacy through use of the abbreviated direct intermediate pathway created language translation.

Further, it is contemplated that this method can be interfaced with various types of synthesizers, e.g., whereby keyboards can be interfaced through computers to modems and where the typing of text will be translated into spoken word for transmission to the recipient, or, voice recognition can be combined with phone modems, e.g., automatic translation of conversations into either written, voice-synthesized translation or other electronic representation. This could be a reversible procedure if the recipient had the same program at his end, or alternatively, it could be received in printed form on the output CRT when received over a modem interfaced with a computer.

Utilization of the method can be applied in commercial situations by an interface of a computer with modem-type communication lines and where desired responses could be made in the sender's national language and translated by the computer to be transmitted over the communication lines in the national target language of the recipient. It is contemplated that the written document could be synthesized into a synthesized voice translation or vice versa; all is interchangeable.

IMPROVEMENTS TO SYSTEM

After the initial inventive concepts were filed upon and during the prosecution in the U.S. Patent Office, various concepts and approaches were modified and implemented within the patentable system, that has acquired registered trademark status as the TOLTRAN (R) System, in order to improve the response time, to reduce the size of the data base and to improve the modularity for better acceptance and usability by a PC-type of personal computer. It includes a source language module, an intermediate or Toltran (R) index module, and a destination language module.

SOURCE OR INPUT LANGUAGE MODULE

Broadly this program can be broken down as follows:
1. SOURCE DATA BASE.
   a. A "type number" system provides a number and type designation that is assigned to each word. The number or numbers, letters, or symbols convey(s) semantic and syntactic information. This number(s) or tag(s) on each word tells what "type" of word it is, such as, (but without limitation), a noun, preposition, verb, adverb, adjective, etc., within the context of a particular sentence or clause, and whether the word has been transformed from another form, i.e., from a noun to a verb, a noun to an adjective, an adverb, an infinitive, a conjunctive, or any other possible reconformation of a particular word within the context in which it is utilized.

b. Alternative meaning information is also attached to certain words - - - this alerts the user to possible multiple meanings for the same word, i.e. homonyms, etc.

c. A morphology stripper (as well as a recombinant morphology means in the destination or target language module) is provided as ancillary means to the source data base, which means are capable of working on all words introduced as part of the incoming (and outgoing) text. These actions allow the provision of a minimum size data base of root words. This reduction in size occupied by the data base on the "electronic real estate" in the computer's memory permits a much larger number of words to be carried by a source language data base module, intermediate language module, or destination language data base module.

2. VERB HANDLING.

a. development of the ability to identify verbs in a sentence or clause. This is a contextual function (context recognition) by looking at what comes before and after an alleged verb, along with punctuation.

b. cross-matching and conjugation of verbs.

c. numerical coding of multi-word tenses, i e., "would have been seen", an example of contextual function.

d. inside-out phraseology analysis . . . works on internal phrases before working on the entire sentence, i.e., "I saw the book, written by Jim, which is red."

3. PROPER WORD ORDERING IN DESTINATION LANGUAGE.

a. When translation is roughly drafted in proper word order, this considers the odd-balls and exceptions to basic rules and smooths out sentences, these are things that must be left to the end to do.

4. MODULARITY OF TRANSLATOR.

a. each source module must work with all other destination modules through the intermediate module, the latter remaining universally the same with all source and destination modules, regardless of which languages are involved.

MORPHOLOGY TECHNIQUES

The techniques of stripping down a word to its root form in a degenerative and regenerative morphology as well as recombinant and paraphrased forms are an important feature of this improved method.

INTRODUCTION

This procedure takes advantage of the new conceptual outlook as described in the new Mathematics of Chaos; in which, as opposed to traditional mathematics, there is more than one solution to a problem, one of them correct at any given instance, but all of them containing a correct answer for whatever arises. This is analogous to making a decision to take a left or right fork in a road, then a little later coming upon another fork and having to make a left/right decision, and so on. Traditional mathematics focuses on the finding of "the" correct branch from the outset, whereas applicants' method deals with a multiplicity of possible solutions all used simultaneously and the correct choice being apparent when the solution is needed.

MORPHOLOGY

As applied to linguistics, we are here referring to both prefix and suffix, as well as grammatically inflected forms of all words in a human (natural) language. With a small number of root (base) words, a great deal of new forms can be generated without having to create entirely new words. To illustrate: "build" - - - "building" - - - "rebuilding". In this example, the "-ing" ending (suffix) and the "re-" (prefix) both convey additional nuances of the root word "build". This is a simple example. Complications quickly arise, however, when the variances of spelling, word exceptions, etc. creep into the picture. Many endings which at first glance appear to be easily stripped off the end of word in fact cannot be unless numerous spelling changes are "undone"- English has many of these; other languages all have their own unique and numerous examples of this, and some languages (such as English) have "piggybacking" morphology . . . e.g. "clean-li-ness", where the "ly+ness→-liness" connotes "the state of being". Languages such as those of the Turkic branch take this to the outer limits, and "right-branching" or "right-agglutinating" languages. Some are "left-branching" and convey complex meaning by means of elaborate prefixing. A good English example of both of these together is: "antidisestablishmentarianism", in which "establish" is the root, "anti+dis" are prefixes and "ment+ari+an+ism" are the suffixes. As one can never be sure to even a reasonable degree if a particular ending of prefix stripping rule will be applicable in a specific case or otherwise, it becomes apparent that all rules in a particular case applied simultaneously must yield at least one correct answer! The erroneous results will simply be disregarded. The Mathematic of Chaos (or fractal geometry) as dealt with in "Fractals Everywhere", written by Michael Barnsley, and published in 1988 by Academic Press, Georgia Institute of Technology, shows this to be analagous to the path(s) frequently taken by Mother Nature when "solving a problem".

PREVIOUS APPROACHES

With regards to the reduction of a word to its simplest root, the path typically taken by others has been a convergent search. In many instances, rules that are considered universally true, or at least true in most cases, are applied to words as encountered in a text or by themselves. This task has its most practical use in the translation from one language into another. The root word is returned by the program with or without the stripped away prefix or suffix. This method has several drawbacks. When a rule works, it works very well. Unfortunately, languages are created and altered by humans over centuries of use, and many endings, for example, cannot be universally separated and leave the root word unchanged in meaning—a good case is the fallacy of making "lovely→love+ly"—the meaning has changed and the rule is therefore faulty. This is a shame, for now many words must be bodily carried in the user's dictionary or data base which ties up valuable "electronic real estate" in the computer's memory. On top of this, many otherwise translatable words are lost.

The present invention teaches divergent approach whereby a morphological stripping technique (degenerative) and re-assembly technique (regenerative or recombinant) are used in conjunction with the actual dictionary (electronic) used in applicant's previous computer program to yield a previously unattainable degree of correct and accurate word manipulation. This is the linguistic equivalent of disassembling an automobile, passing the parts individually through a narrow doorway, then reassembling the car on the other side! This method can pass a tremendous amount of information through a small space limitation with this technique.

DEGENERATIVE MORPHOLOGY

Applicant, as detailed above, aplies all relevant rules to a particular word prefix or suffix (ending), in any language chosen for such treatment, which is not found to match the data base, then strips off morpheme while re-forming the one or several variants of how the root could be spelled. (chaos theory). At each of one or several passes, this is done until the word in its "pruned back" form is matched with a term in the lexical data base. The separated morphological information is passed through as separate (and valuable) linguistic information. The data base will only match with the first correct match; the "nonsense" variants are ignored. For example, from "generation" you might end up with two variants "generate" and "generat" - - - the second choice is not a real word and will not be used - - - the important thing, though, is that a situation sometimes exists where it would be correct to not have the silent "e" at the end. This morphology approach uses a divergent approach (using branching), with most probable choice reached first when dictionary match occurs. All previous methods use a convergent approach (trying to determine "the" correct spelling from the outset). The present technique deals with re-attaching the morphemes at a later stage, the regenerative (recombinant) phase, at the destination language of a translation.

UNIVERSAL/REVERSIBLE MORPHOLOGY BRIDGE

After correct morpheme+root word are selected, the information is assigned an equivalent in a list of "supra-language" concepts of which all the morphology of English is just a smaller subset, as is that of Spanish, Russian, Chinese, etc. This allows for a sophisticated substitution of corresponding endings in the destination language or languages. Some concepts may be just a reiteration of what was input (e.g. many Greek-origin prefixes such as "tele-") or an entire paraphrase may be used when that language has no equivalent. (For example, going from English "-ism" ends up being two Chinese characters for "zhuyi" in Mandarin added to the end).

The following exemplary diagram gives an overall view of the back and forth scheme from one language to another (here using English and Spanish as examples, but any will do) - - - pay attention to the directions of the arrows:

| SOURCE (Eng) | TOLTRAN Concept List | | TARGET (Span) |
|---|---|---|---|
| | 1 | — | |
| [AJ + -ism]<-----> | 2 | <-----> | -ismo |
| -hood ) | 3 | | |
| -ship ) ---> | 4 | ------> | [el estado de ser] |
| -liness) | 5 | | |
| | 6 | | |
| -tion<-----> | 7 | <-----> | cion |
| [VB + -ing]<-----> | 8 | <-----> | [VB + -ndo] |
| | 9 | | |
| ["little" + word]<--- | 10 | <------ | (-cito<br>(<br>(-cillo |
| | 11 | | |
| -ness<------ | 12 | <------ | (-idad<br>(-adad<br>(-edad |
| | 13 | (For future usage) | |
| | 14 | | " |

AJ = adjective and
VB = verb

A more detailed illustration of a few English morphological stripped endings with Spanish equivalents or paraphrases is shown below. The stripping process proceeds downward through descending length character strings until a match is found.

| English | Esperanto("TOLTRAN Bridge") | Spanish Ending/Paraphrase |
|---|---|---|
| 8 Characters Long: | | |
| -smanship --> | [(W$-8] + (MANSHIP)]----> | ("ser(NNmasc)hombre de" + R$) |
| 7 Characters Long: | | |
| -lingual --> | [(W$-7) + (LINGUAL)]-----> | (R$ + "-lingu"e(AJ)") |
| -speople --> | [(W$-7) + "-man" (NP)]----> | (hombres(NPm) de" + R$) |
| | [(W$-6) + " " + ,MAN-NP)]---> | (hombres(NPm) de" + R$) |
| 6 Characters Long: | | |
| -acious ---> | [(W$-3) + "-ity" + (OUS)] ---> | (R$ + "idad(NNf)") |
| | [(W$-4) + "-e" + (OUS)] -----> | (R$ + "oso(AJ)") |
| -ectomy ---> | [(W$-6) + (ECTOMY)]------> | ("extraccio'n(NNf)de" + R$) |
| 5 Characters Long: | | |
| -acity ---> | [(W$-2) + "ous" + (ITY)]----> | (R$ + "-idad(NNf)") |
| | [(W$-5) + "-e" + (ITU)]----> | (R$ + "-idad(NNf)") |
| -active ---> | [(W$-5) + (ATIVE)]-------> | (R$ + "-atovp(AJ)") |
| -borne ---> | [(W$-5) + (BORNE)]--------> | ("tran'sportado por" + R$) |
| 4 Characters Long: | | |
| -cate -----> | [(W$-2) + "-al" + (ATE) -----> | ("hacer"(VB)" + R$) |
| -like -----> | [(W$-4) + (LIKE)]--------> | (nextw$ + "como(CJ) + R$) |
| -side -----> | [(BY-THE(PP) + (W$-4)]-----> | ("a(PP) + DA + R$) |
| 3 Characters Long: | | |
| -ard ------> | [(W$-3) + (ARD)]-----------> | (R$(VB) + "-ador") |
| -ine ------> | [(W$-3) + (INE)]-----------> | (R$(AJ)) |
| -oid ------> | {(W$-3) + "-al" + (OID)]----> | (nextW$ + "en forma de" + R$) |
| 2 Characters Long: | | |
| -ae ------> | [(W$-1) + (NP)]-----------> | (R$(NN) + noun plural end) |
| -ar ------> | [(W$-3) + (AR)]-----------> | (R$(NN) + "-ar (AJ ending)") |
| -ie ------> | [(W$-2) + (LITTLE)]-------> | (R$(NN) + "-ito(NNm)") |
| 1 Character Long: | | |
| -a -------> | [(W$-1) + "-on" + (NP)]-----> | (R$(NN) + noun plural end) |
| | [(W$-1) + "-um" + (NP)]-----> | (R$(NN) + noun plural end) |
| -i -------> | [(W$-1) + "-us" + (NP)]-----> | (R$(NN) + noun plural end) |

NOTES OF CHARACTERS;
W$ = notation for "word"
R$ = notation for "Root word" (translated)
AJ = Adjective
AJ-COM = Adjective-Comparative (-er --> ma's + AJ)
AJ-SUP = Adjective-Superlative (-est --> ma's + AJ)
DA = Definite Article ("the" --> "el/la/los/las")
NN = Noun
NP = Noun Plural indicator
NM$ = Number (spelled out word)
PP = Preposition
PT = Verb Past Participle
nextW$ = Word following (e.g.Spanish AJ's go after NN)... (do only if next word is a noun, otherwise ignore)
RP = Relative Pronoun (e.g. "winds that blow")
***No match is considered if stripped down root is a conjunctive!

It should be recognized that the normal lists for morphological stripping are much longer than the exemplary showing above. The copyrighted codes utilized by a programmer for shortening the amount of electronic space required for each entry as well as for providing comparative uniformity between coded lists of various languages has not been included because of proprietary considerations.

REGENERATIVE MORPHOLOGY

Regenerative or recombinant morphology is trickier—there will be only one correct ending in the destination language, but several possible endings from the source language. Therefore the method must now converge all possibilities into one which is always true, or use a paraphrase which conveys the exact same meaning. Once again it is necessary to match up the ending selected against the root word given us by our electronic dictionary data base, which will give us the two things in the destination language we need re-connected. This is the mirror image of the degenerative stage, only we have to be cognizant of the spelling shifts (if they exist) in the destination or target language. This will be determined by using the table in reverse which was used in that target language when it is used as a source language.

MISCELLANEOUS

This procedure also works well with common word compounds where there is a blurred line which separates what is morphological from what are common word endings which are words in their own right (e.g. "-man" or "-worker", etc.) This method also incorporates various inflected endings of verbs, noun plurals, common root word stem-changing shifts, and anything else involving spelling of an encountered word different from the form in which it would be found in a standard dictionary.

In some instances it has been found that a simple direct translation is desired since the language is amenable to such a method since the direct translation is possible without losing any of the importance in the words.

The following example of how a sentence is handled in a syntactical translation within the program will provide a better understanding of the system in operation, including the utilization of a source language module, an intermediate language utility or interface module, and a target or destination language module. The morphology techniques used in the Toltran (R) System are both Degenerative and Regenerative, as well as Recombinant and Paraphrased. The exemplary sentence and the words therein shall be capitalized to assist in recognition.

Example Sentence:

"MACHINE TRANSLATION IS ONLY TO REDUCE THE WORK INVOLVED IN HUMAN TRANSLATION."

GENERAL ALGORITHM FOR A SYNTACTICAL TRANSLATION

1.) The program reads the input file a character at a time until it reaches some form of punctuation which terminates a statement. (Period, comma, exclamation, dashes, elipsis, question mark, etc.) Only one statement is processed at a time—all punctuation falls through as is appropriate.

2.) Each word in the sentence or clause is looked up in the dictionary data base in a preliminary search. If no match is found for an individual word the dictionary returns an error code. Then it goes to morphology which strips successive endings or prefixes off the word and modifies it to see of the "root" is in the dictionary. In the exemplary sentence, "INVOLVED" will not be found. The "ED" is removed and another lookup is tried with "INVOLV". It will not be found so then a silent "E" is put on the end and another lookup is tried. Of course "INVOLVE" is found it then is marked with a number that corresponds to the fact than an "-ED" was removed and this word could be a verb. This process always starts morphology from large endings to small ones—no word enters unless it is one letter bigger than the ending being tried.

3.) The dictionary data base returns possible grammatical information about each of the words. However, morphology will supercede this information. The individual word now looks like this:

| WORD | |
| --- | --- |
| Toltran index | ) |
| verb tense | ) These are examples of the |
| word type | ) numbers, flags, or symbols |
| person/gender | ) attached to the word for |
| indeterminate flag | ) informational purposes. |
| capital flag | ) After some/or all of these |
| idiom flag | ) numbers are attached to the |
| flag | ) word in the analysis |
| | ) carried on by the source |
| | ) language module, then these |
| | ) are carried by the "word" |
| | ) when it is passed into the |
| | ) TOLTRAN (R) intermediate |
| | ) language module and in |
| | ) passing to the destination |
| | ) language module as well. |

The dictionary will return the word type most common to that word or a type which says it may be many parts of speech. In our example "MACHINE" and "WORK" are two such latter words. "MACHINE" may be a verb, adjective, or noun. "WORK" may also be the same combination of possibilities. Grammatical analysis will tell us which type of word form is being utilized. If the word is capitalized or is all caps, the capflag is set. If the word is part of a known idiomatic phrase, that flag, is set by the program. And most important, the Toltran index number is returned which is the key to the word in any language.

4. COMMENCEMENT OF ANALYSIS: The sentence or clause is searched for ambiguous words.

a.) If morphology has determined the word the indeterminate flag is set so we look there. In the example, the word "MACHINE" is ambiguous, but did not pass through morphology so it is necessary to look at the proximal words. It is the first word, which is a clue followed by a noun. Best guess is the adjectival form (unfortunately, it is impossible to be 100% sure). "WORK" is the next ambiguous word, but the word before it is an article so it must be a noun (100% sure here)

b.) Once the word type has been resolved we again look up the word in the dictionary so that we have the proper type and the proper Toltran index. If a word has three possibilities then it appears three times in the dictionary. This is a heuristic approach. Sometimes words must be put aside until other words are determined. This is an intelligent portion of the program. This approach is repeated until no ambiguities are left.

5. VERBS:

Verbs are identified next. Here the operation is started at the end of the sentence and works forward. The example above is an interesting sentence because there are no clear clause markers, but there are two main verbs. This portion of the program is also intelligent because it stops processing when it encounters new main verbs or definite clause markers and punctuation (commas in particular). The operation is looking to collect modals and auxilliary verbs here to identify the tense.

In the present example we have "involved". The program looks to see the ending (or, if resolved by morphology, its return which is located in the flag). Here it is "-ed" which denotes simple past tense and it is so marked as a main verb past tense. It keeps going and finds "is". This could be a stand alone form of the verb to be or an auxiliary verb. We already have a past tense and "is involved" is a legitimate construct. There are no clear clause indicators, so the tense would be labeled present progressive; the "is" going with the main verb. Now this is correct. If you rearrange the sentence to: "TO REDUCE THE WORK, MACHINE TRANSLATION IS INVOLVED IN HUMAN TRANSLATION", you see that the original analysis is correct. The word "REDUCE" is also a verb, but when the program comes to this it looks for "TO" before a verb first. If it is there it marks it as an infinitive and moves on to further translation. Verbs are tensed at this point and during this process the program also checks for auxiliary verbs and modals, the latter being set aside at this time.

6. SUBJECTS AND OBJECTS:

After verbs are tensed the subjects and objects are located next. Here the proximal rule applies as well as involving some clause analysis of the type outlined in the VERB section above. Again the program starts with the last verb in the sentence and works backwards looking for nouns as well as moving forward from the verb looking for nouns. On each side of the verb the program looks for clause and direction markers (for example: "which" is a typical clause marker, "to" before indicates an infinitive, but after indicates direction). Direction indicates an object. Clause markers tell us where to look for subjects (also the absence of a clause marker). If subjects are understood ("Give the book to him") they are inserted and handled. In this fashion the program looks for nouns before the verb for subjects, and after the verb for objects, skipping known intervening clauses. It starts at the auxiliary verb and moving to the first noun after the beginning is "TRANSLATION". This is a third person singular ("TRANSLATION" is singular since the program knows no plurals, no 's'). It could have found "WORK" if the program started at the main verb, in this particular example it would have made no difference, the programs preferably starts at the auxiliary verb because it generally seems that subjects commonly precede it. To find the object it starts at the main verb. Looking forward the first noun is "TRANSLATION" so it is marked as the object.

7. This concludes the syntactical and lexical analysis in the Source Language. All necessary information in the form of numbers, letters and symbols has been appended to the individual words in the context of the exemplary source sentence, and, the sentence, now complete, is output to the intermediate language file. All information having appended to the words from the Toltran index it is then written out in intermediate form to a file in the intermediate module one sentence at a time, to be read back by the destination language in the destination or target module. Source processing and destination processing are two separate programs—this is important to remember. It allows the user to go from anywhere to anywhere by reading the intermediate language file, as visualized by the spokes of the wheel in FIG. 3. Processing is continued until the end of the input file is reached.

If the user has his own user lexicon then he can tailor the original program to suit his own needs. If the user has defined a particular word differently than the data base does, then his definition supercedes that of the program in the lookup and it is processed thereafter in the same way as if it were part of the original program definition.

Phrases are also identified idiomatically at the end of each sentence. If a word is part of a phrase it is assembled, using the same mechanism by which verbs are handled. A separate phrase/idiom database exists and its intermediate number is used in place of the phrase.

At this point the source language program ends with each sentence reposing in files that have been translated into the intermediate language with the Toltran indexes attached to each word awaiting the translation into the destination language.

DESTINATION OR TARGET LANGUAGE

Using the same sample sentence from the source language above, we now come to the destination.
GENERAL ALGORITHM:

1. Intermediate language is processed one sentence at a time. A period, question mark or exclamation ends a sentence.
2. Each intermediate module word is looked up in a destination module lexicon data base. This lexicon lookup is a little different in the destination lexicon data base than in the source lexicon data base. It now is not concerned as much with the word as it is with the Toltran index. The destination module lexiconal data base also contains irregular word stems and alternative word selections. The word that the target or destination module lexicon returns is the "best fit" but it may not always be the correct one and hence the user is given a choice (e.g. "party" in English is "fiesta" in Spanish, but, a political "party" in English is "partido" in Spanish, so the program gives the user a choice). The program recognizes by the size of a particular entry from the intermediate language module if there is additional flag information to be found and presented to the user for a choice. If no match is found for a particular word it is then dropped through.
3. If the word is found to contain morphology information and has passed through morphology, the morphological information attached to the intermediate word is preserved. Morphology guarantees a match since words listed in any source or target module will appear in all languages. Such morphology treated words may not be correct in direct translation and hence the word in the lexicon may not be correct and must be changed. (For example: "slowly" may not be in the dictionary but "slow" is, so it is necessary to make it an adverb and the correct ending in the destination language must be added). This is done in a recombinant morphology routine. This gets quite complex given spelling changes and cross-language mapping or in some cases paraphrasing the entry ("liquify" may get changed to "to make liquid" in another language). Plurals are done here also (it was noted above that the Toltran index was singular in nature, however, a flag for plurals and gender was attached where necessary and is recognized at this stage).
4. The Destination language is identified and processing takes place.
   a.) Verbs are then cross-matched (all English tenses do not exist in other languages and vice-versa. Subjunctive is a good example of this) to the appropriate tenses and conjugated. If it is irregular the correct stem is pulled out of the extra lexical information. They are conjugated to the subject code verb information passed through in the intermediate file and destination language changed accordingly.
   b.) Phrases/idioms are processed and substituted in place of the original/Toltran intermediate index that came through.
5. Analysis begins:
   a.) Verbs are conjugated according to the cross-match above. Subjects have been identified so that they are conjugated to person also. The intermediate and the cross-match is vital to this.
   b.) Recombinant morphology kicks in again. Morphological information in the intermediate index is reconstructed based on the source language. This is more conceptual rather than mechanical and word substitution may take place. Examples of things can include pluralizing, verbs that turn into nouns, adjectives that turn into adverbs, etc. The lexicons store roots only for the most part and other forms of a word must be reconstituted.
   c.) If the language demands it, agreements are done next. Masculine/Feminine/Neuter endings are applied to the appropriate roots, and any words modifying them. Once a noun is identified we look forward and backwards to see what is present using the classic markers as keys. If the language demands it they are reorganized at this point. (e.g. in Spanish adjectives usually follow the noun—in English they do not). Also Spanish has the upside down exclamation sign and upside down question mark which must be added to the beginning rather than the end of questions and exclamations.

6. Smoothing out now begins. Redundant words and words not used are discarded. Words needed are inserted by analysis (e.g. if no pronoun exists, as would the case of translating from Spanish into English—because in Spanish the pronoun is noted by the verb ending) etc. Paraphrasing may take place if strange constructions are noted by syntactical analysis. User defined words are also substituted if the user has redefined his own lexicon. Any phrases peculiar to the destination are also identified and handled.

7. The sentence is then outputted to the finished file, all punctuation, tabs, carriage returns, etc. are respected.

8. Program ends.

Very little actual processing takes place in the destination language module, most of the work is done in the source language module. The destination module merely does look-up and reconstructs based on information gleaned from the source language and passed through the intermediate by means of the flags, numerals, letters and symbols attached at the source module.

While English to Spanish has been utilized in this exemplary embodiment, the intermediate module utilizing the "Esperantoish" or Toltran index will remain the same and is universal with all languages in that it will accept any source language module and any target or destination language module. Since the total vocabulary of the lexicons of all languages will be substantially identical in all original source modules and will be varied only by the morphology developed from the context of the text being translated and the syntactical relation of the words involved.

While all languages may serve either as the source language or target language, it must be recognized, that due to the nature of the modularized programming, it is necessary to have both a source module as well as a target or destination module for each language if it is desired to be able to reverse translate. However, the universality of the intermediate module permits the user to acquire only those specific language modules required for his particular needs. For example, the English source module can be utilized with any target of destination language module, while the English target module can be used with any source language module, all of which will be accepted by the universal intermediate module that serves as the interface and be appropriately processed.

Probably the most important factor in the present invention is that it is not language specific in any case, the intermediate language module is the item that the entire system points to. This is what separates the present invention from what anybody else has done, namely, the fact that it is not specific as to what is done. The intermediary language, if you will, contains enough information so that it can go anywhere from it. It is the interface, the operating environment that the system presents the user. It is what the user sees on the screen and the accompanying system for issuing commands and receiving information. Everything that is done has the object of producing the intermediate tagged, flagged and symbolized language roots that can then be translated into another language.

The source module language data base is not modified in the normal operation of this system. The lexical data base in the source language has been implemented with word identifiers and other information such that everything can be readily converted into intermediate information. Besides the word identifiers there is a tag on the word to delineate the type of word that it is. There is another tag on the word to indicate its relative part of speech, within the context of the input text to be translated. There are tags in the words that have to to do with verb tensing information and construct information, for instance, whether it is part of a phrase, or a clause, or things of that nature, all of that has been appended onto that intermediate translation so that we have a complete grammatical, syntactical and lexical analysis wherein that information is all appended into that intermediate language of the particular word being treated in the context wherein it is found.

Some of the other types of information that can be attached to a particular word is the fact that there may be many choices of words when you are dealing with other languages. The database has been mapped to take care of the fact that in other languages, by way of example and not by way of limitation, one English word may in Spanish have five or six different corresponding words that are very closely related and interchangeable in some circumstances. This information has been attached to the database so that the user can choose which word is the most appropriate translation given the context.

Additionally, there are words in English that are used to that have the same spelling but yet in another language are totally different words, for example, in read (pronounced rĕd) and read (pronounced rēéd) the sequence of characters is r-e-a-d, but it's the way that it is pronounced, or context in which it is used, that is the difference. Alternative meanings are accounted for so that each possibility can be listed and that is attempted there.

The morphology technique is a powerful set of routines that can find out what has happened to a word. It can analyze it and find out what part of speech it originally was and how it came to be used which gives a lot of information in a sentence as to what is happening in the sentence itself. It also allows the database to be kept to a minimum by putting more important things in the database without taking up a lot of room with plurals and things of that nature which can be made or broken as needed. It permits it to have a much richer language.

It was necessary to have some mechanism to identify which words are verbs in sentences and how they are used. In many situations, the English language is the odd man out, considering that a verb is not necessarily a single word but can be a long string of auxiliary and modal words that convey a tense to you, for example: "He would have gone to the store if he had had the money." While this is used very cavalierly, this is a very complex thing. There are a great number of possibilities in that sentence so what has to be done is again use the analysis on the sentence to connect all of these words that form a verb tense. What has been done in the intermediary is to develop a numeric scheme that analyses sentences and based upon a base "x" number that ends up coming out and based on that number it is possible to cross reference that into other languages. Other alphanumeric systems could also be used as well. If those tenses do not exist then the program is mapped to the closest appropriate tense so that the meaning is preserved. That information is also attached to the intermediary, if the word happens to be a verb the information follows as pertaining to the tense. The problem, with the cross conjugation of verbs, is the fact that many languages are much richer in shades of meaning than other languages are. What must be done, (in the intermediate), is to, cross reference it to the languages we happen to be using as source and destination (again preserving modularity where this intermediate numeric scheme can be used in another language, it only being necessary to know where you are coming from and where you are going to. Again, numerical coding of multiword tenses pertains to what has just been told about the fact the sentence is parsed to find out all of the connecting auxiliary verbs and modals or other forms of the verbs that go together and then they are mapped into the numerical tense that gets attached to the intermediary. The most difficult part is that it is necessary to break the sentence down phraseologically because there can exist compound sentences with many verb tenses and having phrases that also contain verbs in them. What is done is to take an inside-out approach where it is necessary to look at the inside of the sentence and work outwardly, so that all of the phrases are found first, locating what is inside each phrase, and then building out from the phrase in order to identify things needing to be correctly marked. Verbs are one of the last things marked, based upon previously-gleaned grammatical information.

The cross conjugation of verbs has to do with the fact that the system is more or less cross-wiring occurrences in one language to those in another. For example, in English, it is not very often that subjunctives are used. One example of an everyday subjunctive usage is when someone says, "If I were you . . . ", that's subjunctive, or, "Would God if that it would happen . . . ", that also is a subjunctive. While the use of the subjunctive in English is not very great, in other languages, and particularly in many of the Romance languages, the use of subjunctives is quite extensive. Many of the verb tenses we have do not map directly into verb tenses of other languages because they use the subjunctive, so what is done is to isolate all these tenses and then cross-wire them to whatever language happens to be the target, to whatever is most appropriate and that has to do with the previously mentioned intermediary numeric scheme utilized to identify the tenses. In other words, if the system has this number, mapping to present subjunctive occurs in one language, but to something else in another language, so it is again necessary that mapping to whatever language you happen to be going to or from occurs.

In keeping with the earlier disclosures in the original application, the intermediate module language has been referred to as Esperantoish, Toltran index, intermediary language, Super Esperanto, and, basically, only editions, modifications and deletions to the base words in Esperanto have taken place. In other words, much information has been attached and it is not essentially the Esperanto word alone that is important, but all of the information that goes with it as well. This has to do with the fact that the Esperanto word, in and of itself, is attached to a number and that number is the same in all languages and then the information that has been gleaned from it also can be shared between all languages. What is done with the Esperanto word and all of its attachments, be it (1) what kind of word it is, (2) if it is a verb (3) what tense this verb is, and (4) what part of speech it is, and (5) if we have a phrase, where it is located. All these kinds of things are attached to that word; this information is then picked apart in the destination language and whatever is appropriate is done for the destination language based on that attached flagged information.

An example is a single word such as "automobile"(Esperanto: automobilo"). The "automobile" carries over to the intermediate module as "automobilo". Now "automobilo" corresponds in every single language for the translation of "automobile". Therefore, in every single language "automobilo" has been reserved for that language's use of the word "automobile". So that when the system goes into the sentence and looks at the word itself and tries to look it up in the module database lexicon, much as an individual would look it up in a dictionary, it has lots of information attached to it, it will have its use of that word in the source language input text as a noun. It would also have any alternative meaning that it could have in the source, but if it doesn't have any alternative in the source language, it is just "automobile". When it is looked up it would go to the intermediate module file and and become whatever it is that the intermediate language corresponds to "automobilo". The sentence analysis then goes on and finds out if it is an object or a subject, or does further analysis to find out if it is an object of a subject, if it is part of a clause, and will appropriately mark it that way and then all this information is collected, appended onto the intermediate and located in the intermediate file until the destination is invoked. The destination module takes the intermediate file and sees an intermediate word which is automobilo. Now the module goes back to its destination lexicon database and looks it up. In the destination lexicon database it sees that the type is a noun in the destination language, here are its alternative meanings, if any. It is preserved in a file; however, also preserved is the sentence structure (where things were located), so the module decides, based on what it was in English, what the correct correspondencies and phraseologies would be in the destination language.

A more complex example that can be utilized to show the operation of the morphology process can be found in the word "holinesses" (a plurality of bishops). Obviously, it would be highly unlikely that a complex word like this would be found in the source language database. So, when the word is not found in the lexicon database, the morphology would first find that the word was a plural and take the "-s" off and what is left is "holiness". It didn't find that either so morphology would go back to work and take the "ness" off of it. It knows that when some words have an "i" ending in them it has been converted from a "y" into an "i". So now it goes back and strips off the "iness", reattaches a "y" onto it and goes back to the lexicon database. Now it finds "holy". Each time the morphology has gone through and done something to this word it has saved what it has done. Thus, we know that it took off a plural, it took off a noun, and now it has come up with "holy", so that what we have is a "noun" that has been made into an "adjective" that has been made back into a "noun" that has been "pluralized". This information is also appended to the Intermediary information, so now we have the word which is the root so that when we go over to the destination module language database we undo what we have done. In other words, we find the root "holy" and whatever it may be in whatever language we are working in and we try to reconstruct it from what has happened to it in English. This is the very complex and powerful process supplied by the present invention.

We claim:

1. An improved machine translation system having a natural language source module for accepting externally introduced text in said source language, said module including a lexical database, said system being broadly based upon the concept of Chaos and conducts a divergent search in the source language, a morpheme root database, and further including a morphological word stripping means, said means to be implemented on a data processing device, said system source module includes means implementing a method having the steps whereby each of the words in a subject clause, phrase, or sentence of said externally introduced source language text are individually compared first to data in said lexical database and if said individual words are not found among said data in said lexical database then means are provided whereby said words are subjected to said morphological word stripping means, said stripping means being directed to the affixes of said words and first to the stripping of suffixes, if any, from each said word followed by the step of comparing an individual stripped word, in the absence of that particular word's stripped suffix, with the data in said morpheme root database, which comparison normally proceeds downward through descending length character strings until a morpheme root match is found, further stripping and comparison with said database are repeated as often as required to find a root match.

2. A machine translation system as claimed in claim 1 wherein the method utilizing said word affix stripping means also includes means for stripping prefixes, and infixes, if any, from said words in the event that the stripping of suffixes was not adequate for reaching the word root and matching each said affix stripped word to said morpheme root data base.

3. A machine translation system of the type claimed in claim 2 wherein such a divergent search can produce a multiplicity of possible solutions.

4. A machine translation system of the type claimed in claim 3 wherein such a divergent search will also include inflected forms of all words.

5. A machine translation system of the type claimed in claim 2 wherein means for attaching appropriate tags are provided and at least one appropriate tag is attached to said root word denoting the affixes such as prefixes, infixes, as well as suffixes that have been stripped from said root word, along with syntactic analysis, including but not limited to, word type, tense, gender, pluralism, and location clause or phrase, subject, object, and any other identification thought necessary in order to provide a smooth translation into a target language.

6. An improved machine translation system to be implemented on a data processing device, as claimed in claim 5, wherein said system generally consists of three modules, said modules including said source or first module in a first natural national language adapted to accept said externally introduced text in said first language that is to be translated, said text being subjected to said method contained in said source module, a universal second or intermediate bridge module including means for translating said first national natural language into a universal internationally created second language, said second module including means for carrying out said translation with said at least one tag attached to each said word for identification and classification purposes; and a third or target module carrying a second natural national language, said target module including means and a database capable of accepting the tagged words from said second module and readily translating them into said target second natural national language; said universal second or intermediate bridge module being usable universally with all of said first and third or source and target national natural language modules, respectively, regardless of whatever different languages might be resident therein.

7. A machine translation system of the type claimed in claim 6 wherein said third module including means for utilizing a portion of its database for direct translation from said universal internationally created language into said target second natural national language, and a portion of said module having means for recombinant morphology usable in the rebuilding step, if necessary, of root words in said second national natural target language text by the method of addition of morphemes in said target language in order to bring about a relatively accurate and true translation thereof in relation to any stripped affixes carried out in said first module.

8. A machine translation system of the type claimed in claim 7 wherein said word stripping is the degenerative stage of morphology in the source language while said recombinant or replacement of the stripped suffix/prefix to the root word is the generative stage of morphology in the target language, the generative stage being substantially a mirror image of the degenerative stage.

9. A machine translation system of the type claimed in claim 8 wherein said generative stage is based on substantially the reverse of the degenerative morphology table of said target language when it is used as a source language.

10. A machine translation system of the type claimed in claim 9 wherein said generative morphology is the means for recognizing and being cognizant of spelling shifts, if they exist, in said target second language contained in said third module.

11. A machine translation system for translating text from a first national natural source language to a second national natural target language through a universal machine method adapted to be implemented on a data processing device including a first module having a lexical database identifiably with said source language and said first module including means capable of performing a syntactic and lexical analysis on said text and attaching informational tags on each word of said text, a universal intermediate second module providing an interface having an operating environment for display to a user and a basis for issuing commands and receiving information, said second module also including a lexical database in an intermediate international created language that is capable of accepting said syntactic and lexical analysis of said text from said first module and including means for translating said source language words carrying said informational tags into said international created language while retaining said informational tags, and a third target module having a lexical database identifiable with said second national natural target language, and including means to accept said intermediate created language with its tagged words of said text and proceed to translate the text into the target national natural language, said second module being universally accepted by a multiplicity of differing national languages each of which has one of its own said first source module of one of its own said third target module; said first module also including a root word morpheme database, and having means whereby any individual words of said source text which cannot be initially matched with a word in said first module lexical database are then subjected to morphological stripping of endings and prefixes until the root of said words can be matched with said root word morpheme database, appropriate designating tags are attached to each said root word indicating, but not limited to, the root word designator, type of word, tense, gender, pluralism, and particular ending or prefix morpheme stripped therefrom, means are provided so that appropriate morphemes can be added to the translated root word in the target language of said third module, said system further including means for inputting text into file means in said first module, said machine method includes means adapted to read the said input file a character at a time until it reaches some form of punctuation which terminates a statement, including periods, commas exclamation marks, dashes, ellipsis, question marks; said last mentioned means is directed to process only one statement at a time and all punctuation falls through as is appropriate; means are provided wherein each word in the statement is looked up in the lexical database, if no match is found for an individual word the lexical database returns an error code; said individual words returned with an error code goes to a morphology database including means which strips successive affixes, including suffixes or prefixes, off said word and modifies it to determine if the root of said word is in the lexical database, such a termination is made by checking said word against said database each time a morpheme is stripped from said word, and repeated until a match is found, said lexical database returns grammatical information about each of said words, however, said morphology database includes means that has the power to supersede this grammatical information during said stripping operation, however, if said word is of the type that may be many different parts of speech, including a verb, noun, adjective, adverb, article or preposition, and is ambiguous and/or did not pass through morphological stripping; means are provides for an indeterminate flag to be set and additional means are provided whereby a grammatical analysis is performed by examination of the proximal words, if the said word is the first word followed by a noun the probability of it being adjectival is very high, if, on the other hand if the word before said word is an article said word must be a noun, in either event said word is appropriately flagged as to word type, once said word type has been resolved, in the lexical database, means are provided whereby it is tagged as to type and the proper individual identification for said word, which identification remains the same regardless of what language or what module the text may reside, if said word has multiple possibilities as to its type, as set forth above, namely including verb, noun, adjective, adverb, article, or preposition, then means are provided whereby a heuristic approach is utilized land it will appear as many times as there are possibilities, lookups are repeated a plurality of times until no ambiguities are remaining, said system further including program means whereby verbs are identified next by starting at the end of the sentence and/or statement and working forward until a first main verb is located, said system program means is intelligent since it stops processing when it encounters any additional main verbs or definite clause markers or punctuation, said program means then continues and if a verb is marked as an infinitive said program means moves on to further translation, verbs are tensed and during this process the said program means checks for modals and auxiliary verbs and sets them aside for later treatment.

12. A machine translation system as claimed in claim 11 including means whereby, after verbs are tensed, subjects and objects are located by proximal rule along with clausal analysis, said means then commences with the last verb in the statement and works backwards looking for nouns as well as moving forward from the verb to look for nouns, on each side of said verb the program means looks for clause and direction markers, direction indicates an object when after said verb, and the program looks for nouns before the verb for subjects.

13. A machine translation system as claimed in claim 12 including means wherein phrases are identified idiomatically at the end of each sentence, if a word is part of a phrase it is assembled, using the same mechanism by which verbs are handled, a separate phrase/idiom database is provided and when it is identified an intermediate number is used in place of the phrase, means are provided in said third module database for accepting phrases in their own database and translating them into the target language from the intermediate language bridge.

14. A machine translation system as claimed in claim 13 wherein means are provided whereby the user has the option to use his own lexicon to define a particular word differently than the database has done, once the user has introduced his definition it will supersede that of the program in the lookup and will be processed that way thereafter as if it were part of the original program definition.

* * * * *